United States Patent [19]

Beynon et al.

[11] Patent Number: 4,765,752
[45] Date of Patent: Aug. 23, 1988

[54] RADIATION THERMOMETERS

[75] Inventors: Thomas G. R. Beynon, Sheffield, England; Peter J. Kirby, Yardley, Pa.

[73] Assignee: Land Infrared Limited, Dronfield, England

[21] Appl. No.: 820,250

[22] Filed: Nov. 15, 1985

[30] Foreign Application Priority Data

Mar. 5, 1985 [GB] United Kingdom ............... 8505631

[51] Int. Cl.$^4$ ........................... G01J 5/00; G01K 1/14
[52] U.S. Cl. .................................. 374/153; 374/144; 374/127; 374/121; 356/45
[58] Field of Search ...................... 374/127, 121, 128; 356/43, 45; 374/120, 126, 144, 153; 415/118

[56] References Cited

U.S. PATENT DOCUMENTS

| 3,584,509 | 6/1971 | Compton | 374/144 |
| 3,610,592 | 10/1971 | Murray | 374/126 |
| 3,611,805 | 10/1971 | Hishikari | 356/45 |
| 3,696,678 | 10/1972 | Mossey | 374/153 |
| 3,849,000 | 11/1974 | Soardo et al. | 356/45 |
| 4,222,663 | 9/1980 | Gebhart et al. | 356/45 |
| 4,326,798 | 4/1982 | Kahn | 374/127 |
| 4,411,519 | 10/1983 | Tagami | 356/45 |
| 4,582,426 | 4/1986 | Douglas | 374/121 |
| 4,657,386 | 4/1987 | Suarez Gonzalez et al. | 356/43 |
| 4,659,234 | 4/1987 | Brouwer et al. | 374/126 |

FOREIGN PATENT DOCUMENTS 2365108 4/1978 France ................................. 356/43
1423290 2/1976 United Kingdom ................ 374/127

OTHER PUBLICATIONS

Beynon, "Infrared Radiation Thermometry Applied to the Development and Control of Gas Turbines", High Temperature Technology, Nov. 1982 pp. 85-91.

Primary Examiner—William A. Cuchlinski, Jr.
Assistant Examiner—Thomas B. Will
Attorney, Agent, or Firm—Finnegan, Henderson, Farabow, Garrett & Dunner

[57] ABSTRACT

A radiation thermometer comprises two radiation detectors for detecting radiation in wavelength bands centered on two different wavelengths $\lambda_1, \lambda_2$ (where $\lambda_1 > \lambda_2$) from a rotating body such as a gas turbine motor and for generating first and second signals $S_1, <S_2>$ respectively related to the radiance profile around said body and the average radiance around said body. A time averaging circuit generates a signal $<S_1>$ representing an average value of said first signal. A dividing circuit generates a signal related to the ratio of $<S_1>$ to $<S_2>$; and a monitor monitors at least one of said signals, predetermined arithmetic combinations of said signals, and quantities related thereto and provides corresponding output signals.

12 Claims, 5 Drawing Sheets

RADIATION THERMOMETERS

FIELD OF THE INVENTION

The invention relates to radiation thermometers and methods for monitoring at least one temperature characteristic of a rotating body, for example the temperature characteristics of turbine blades in a gas turbine.

DESCRIPTION OF THE PRIOR ART

It is now generally considered that radiation thermometry provides a practical way of monitoring the temperature of rotating bodies such as gas turbine rotors having a plurality of turbine blades. Furthermore, recent advances in radiation thermometry have made practicable control of gas turbines by means of an infrared measurement of the temperature of the turbine blades. (see "Infra-red radiation thermometry applied to the development and control of gas turbines" in High Temperature Technology, November 1982 pp85–91).

In the past, radiation thermometers have been of two types. In the "monochromatic" (single waveband) types radiation from the rotating body is sensed within a single waveband. This type more easily permits the band width and signal-to-noise performance necessary to track the temperature profile around the rotating body to be achieved.

In the "ratio" type radiation is sensed in two different wavebands and the ratio between the sensed intensities determined. The ratio type is more tolerant of optics fouling or obscuration but lacks the advantages of the "monochromatic" type.

It might be thought that advantages of both types could be obtained by using two monochromatic type thermometers operating at different wavebands. However, it should be noted that the radiation intensity available falls very rapidly with decreasing wavelength—about a 12th power law at typical temperatures. In practice this can mean that the signal available in the shorter wavelength band is about 100 times less than in the longer. This difference makes it impracticable to operate both wavebands (or channels) at sufficient band width and with a fast enough response to track blade-to-blade temperature variations.

SUMMARY OF THE INVENTION

In accordance with one aspect of the present invention, a method of monitoring at least one temperature characteristic of a rotating body comprises sensing radiation emitted by the body in wavelength bands centred on two different wavelengths $\lambda_1$, $\lambda_2$ (where $\lambda_1 > \lambda_2$) to determine first and second quantities $S_1$, $<S_2>$ respectively related to the radiance profile around the body and the average radiance around the body; determining an average of the first quantity $<S_1>$; determining a quantity related to the ratio of $<S_1>$ to $<S_2>$; and monitoring one or more of the quantities and/or predetermined arithmetic combinations of the determined quantities or quantities related thereto.

Preferably, the method further comprises determining a peak $S_{1p}$ of the first quantity.

Typically, the first and second quantities will comprise electrical signals.

This method combines the features of monochromatic and ratio type radiation thermometry in such a manner that the advantages of both can be obtained without significant disadvantages. For example, the method permits the measurement of rotor peak temperature, or temperature profile, with a bandwidth and signal to noise ratio approximately equal to that obtainable with a monochromatic type and with a tolerance to optics fouling approximating to that obtainable with a ratio type. In addition, as will be described below, the method enables self-diagnosis of optics fouling to be achieved.

The invention is also particularly important in connection with the monitoring of aircraft engines because it can introduce a certain degree of fail-safeness whereas the monochromatic type methods are inherently fail-dangerous.

The mean quantities such as $<S_1>$, $<S_2>$ could be determined by using slow response detectors, or by averaging signals obtained by fast response detectors, or for example by slew rate limiting.

Preferably, the method further comprises determining equivalent temperatures to $S_{1p}$, $<S_1>$, and the ratio of $<S_1>$ to $<S_2>$ prior to carrying out the monitoring step. This may most conveniently be achieved by comparing the determined radiance quantities and ratio with pre-determined calibration tables to generate equivalent temperatures $T_{1p}$, $<T_1>$, and $<T_R>$.

The equivalent temperature (T) to a radiance (S) is defined as the temperature of a black body which has a radiance (S). These quantities are related exponentially by Wien's Law:

$$S = K \exp(-14388/\lambda T)$$

where K is a constant $\lambda$ is wavelength in microns, and T is equivalent temperature in Kelvin The wavelength bands will preferably be narrow and of the order of one micron and may typically overlap. Conveniently, each wavelength band is centred on an infra-red wavelength with $\lambda_2 < \lambda_1$. For example, $\lambda_1$ may be 0.98 microns and $\lambda_2 = 0.83$ microns.

In one example, the monitoring step comprises determining $T_X$, where:

$$T_X = <T_R> + T_{1p} - <T_1> \qquad (1)$$

This represents the temperature of the hottest point on the rotating body. Further, examination of the way in which this output is constructed reveals that the signal to noise ratio is effectively that of a monochromatic system, yet the tolerance to optics fouling is approximately that of a ratio system. This is because the potentially noisy ratio signal $<T_R>$ is used in a time averaged form, and the obscuration-sensitive signal $T_1$ is used only as the comparatively small quantity $T_{1p} - <T_1>$. Furthermore, in practice, there is an approximately logarithmic relation between $T_1$ and $S_1$ hence an attenuation due to obscuration in $S_1$ appears as an offset in $T_1$ and cancels $T_{1p} - <T_1>$.

In a second example, the method further comprises determining an equivalent temperature $(T_1)$ to $S_1$, the monitoring step comprising determining $T_y$ where:

$$T_y = + <T_R> + T_1 - <T_1> \qquad (2)$$

This represents the rotating body temperature profile and has the same advantages in respect of signal/noise and obscuration as with $T_X$ described above.

It should also be noted that comparison of the outputs $<T_1>$, $<T_2>$, and $<T_R>$ forms an indicator of the presence of fouling. If there is no fouling, and provided the target radiates as a black body radiator, then the instrument calibration ensures:

$$<T_1> = <T_R> = <T_2> \quad (3)$$

In the presence of fouling this relationship is disturbed and the precise manner in which it is disturbed depends on the spectral characteristic of the obscuration. However, maintenance of the above equality is a sensitive indicator that the optics are not fouled. A simple but important instance is when a "grey" obscuration occurs (ie. one which affects both wavebands equally, or approximately so). In this case $<T_1>$ will drop below $<T_R>$ since the affect of obscuration cancels in taking the ratio $<S_1>/<S_2>$. If the rotating body does not radiate as an ideal black body, the effect is typically to introduce an offset into the $<T_1> = <T_R>$ equality which is either constant or may be determined as a constant function of engine condition. Thus a change in $<T_R> - <T_1>$, from its normal value at a given engine condition, may be taken as indicative of optics fouling.

Preferably, therefore the monitoring step comprises determining $<T_R> - <T_1>$.

Optics fouling is, in general, a gradual process, hence the presence of fouling need be tested only relatively infrequently. This may permit the comparison of $<T_1>$, $<T_R>$ always to be made under conditions of optimum measurement precision.

Fail-safeness assumes that $<T_R>$ is never less than $<T_1>$, but this is conceivable with spectrally dependant absorption. Such absorption is most likely to occur during build-up of layer thickness, during which preferential absorption of the short waveband might be reasonably expected. In this case, as an alternative to the first example, the method may comprise determining an equivalent temperature ($<T_2>$) to $<S_2>$ and the monitoring step may comprise determining $T_X$ as follows:

$$T_X = <T_R> + T_{1p} - <T_2> \quad (4)$$

In accordance with a second aspect of the present invention, a radiation thermometer comprises radiation detection means for detecting radiation in wavelength bands centered on two different wavelengths ($\lambda 1$, $\lambda 2$) (where $\lambda 1 > \lambda 2$) from a rotating body and for generating first and second signals $S_1$, $<S_2>$ respectively related to the radiance profile around the body and the average radiance around the body; means for generating a signal $<S_1>$ representing an average value of the first signal; means for generating a signal related to the ratio of $<S_1>$ to $<S_2>$; and monitoring means for monitoring one or more of the signals and/or predetermined arithmetic combinations of two or more of the signals and for providing corresponding output signals.

Typically, the detection means generating the signal $S_1$ operates at a fast rate compared with the detection means generating the signal $<S_2>$.

DESCRIPTION OF THE DRAWINGS

Some examples of methods and apparatus in accordance with present invention will now be described with reference to the accompanying drawings, in which.

DESCRIPTION OF THE EMBODIMENTS

Figure 1:
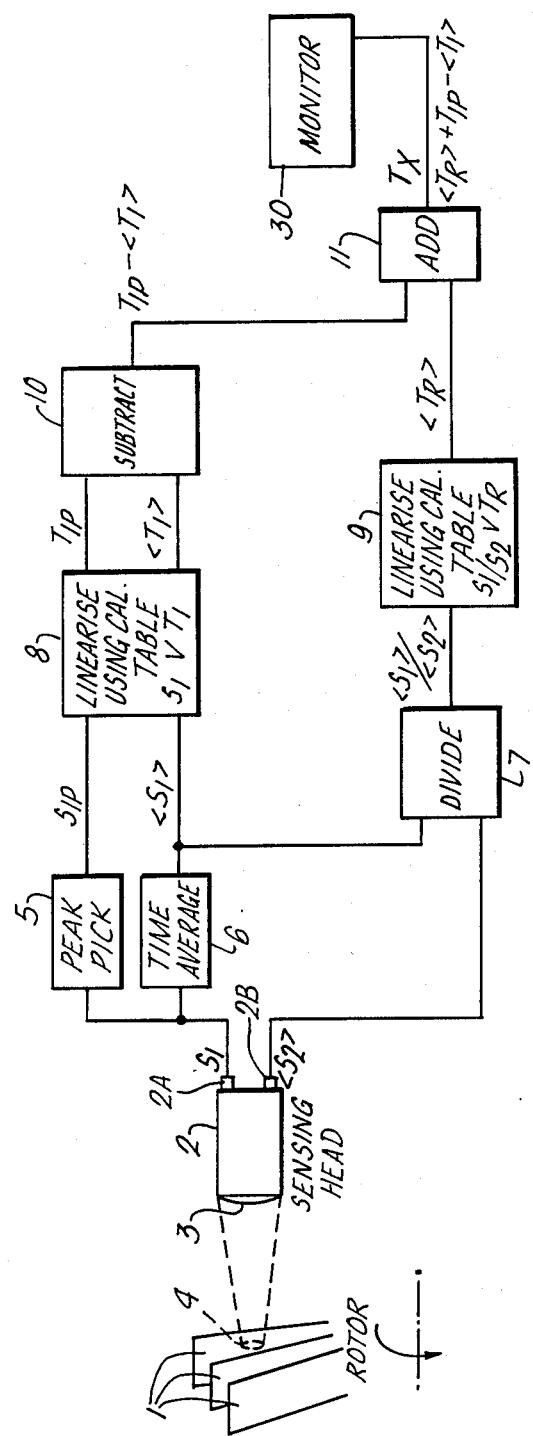
FIG. 1 is a schematic block diagram of one example.
Figure 5A:
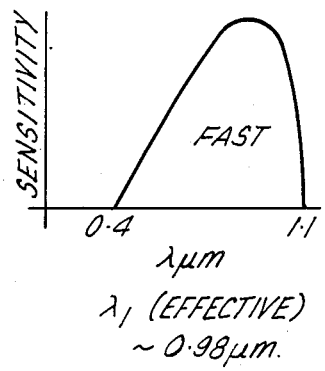
Figure 5B:
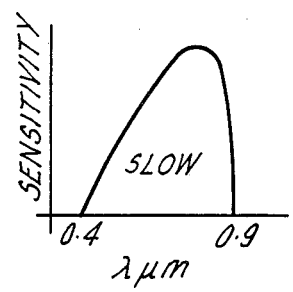

The apparatus shown in FIG. 1 is adapted for monitoring the temperature characteristics of the rotor blades 1 of a gas turbine rotor of for example an aircraft engine. The apparatus comprises a sensing head 2 having a lens 3 which focusses radiation from a target spot 4 through which the rotor blades 1 pass onto two detectors 2A, 2B at the rear of the sensing head 2. The detectors are sensitive to radiation in two different wavelength bands illustrated in FIGS. 5A, 5B respectively. Each detector generates an output signal $S_1$, $<S_2>$, which are respectively proportional to the target spot radiances in the two wavebands. The $S_1$ detector has a fast response so that in operation $S_1$ tracks the radiance profile around the rotor. The $<S_2>$ detector has a relatively slow response so that its output signal is time averaged and represents the average radiance around the rotor. In this context, "fast" means a response time less than the time it takes one blade to cross the optical axis, for example $10^{-5}$ seconds while "slow" is only limited by the reaction speed required for the system. For example, it could be 10 second or more in an industrial turbine, or for example 1/10 seconds in an aero engine.

Although the target spot 4 is shown to be the same for each detector this is not essential in practice and in fact some mismatch is tolerable.

The $S_1$ signal is fed in parallel to a peak picking circuit 5 and a time averaging circuit 6. The peak picking circuit 5 determines the peak value of the incoming signal $S_1$ and this will correspond to the radiance at the hottest point on the rotor. The time averaging circuit 6 averages the incoming signal $S_1$ to provide a time average output signal $<S_1>$. In general, this time average signal will not be the same as the signal $<S_2>$ since they correspond to the radiances at two different wavelength bands.

The two time averaged signals are fed to a division circuit 7 which provides an output $<S_1>/<S_2>$.

The outputs from the circuits 5, 6, 7 are then linearised by conversion to equivalent temperatures. This is achieved by applying the signals to look-up tables 8, 9 which have been generated previously by determining the signals $S_1$, $S_2$ corresponding to known temperatures. The output signals from the look-up tables 8, 9 are labelled $T_{1p}$, $<T_1>$, and $<T_R>$.

The signals from the look-up table 8 are fed to a substracting circuit 10 which provides an output signal $T_{1p} - <T_1>$ which is fed to an adder 11 along with the output signal from the look-up table 9. The output from the adder 11 constitutes $T_X$ defined as:

$$T_X = <T_R> + T_{1p} - <T_1> \quad (1)$$

This output represents the temperature of the hottest point on the rotor. This is fed to a monitor 30 which may comprise a suitably programmed computer which causes $T_X$ to be displayed or uses the result to control the gas turbine. Alternatively, the monitor may simply be a scale for indicating $T_X$ which is observed by an operator.

Figure 2:
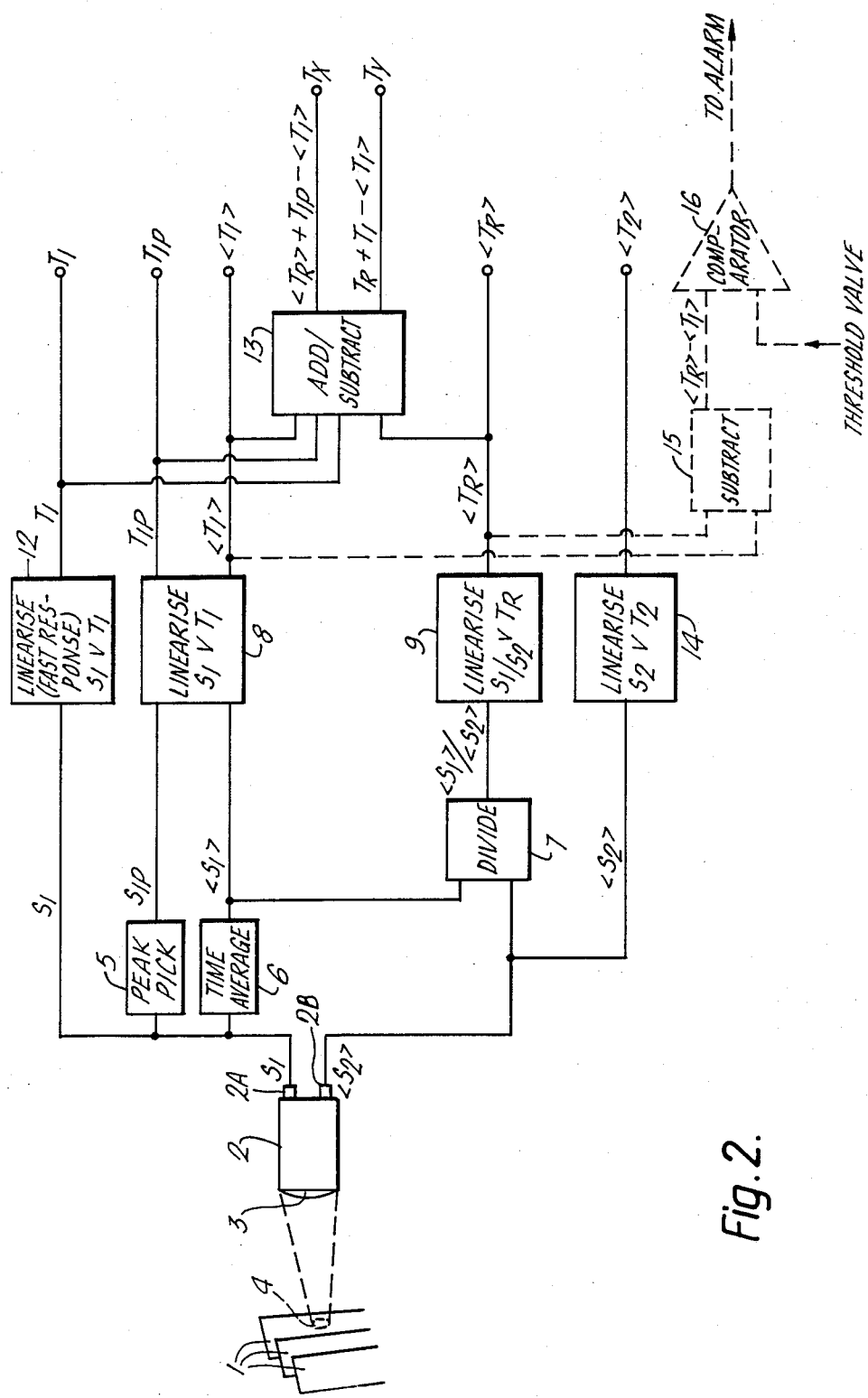
FIG. 2 is a schematic block diagram of the second example.
Figure 3:
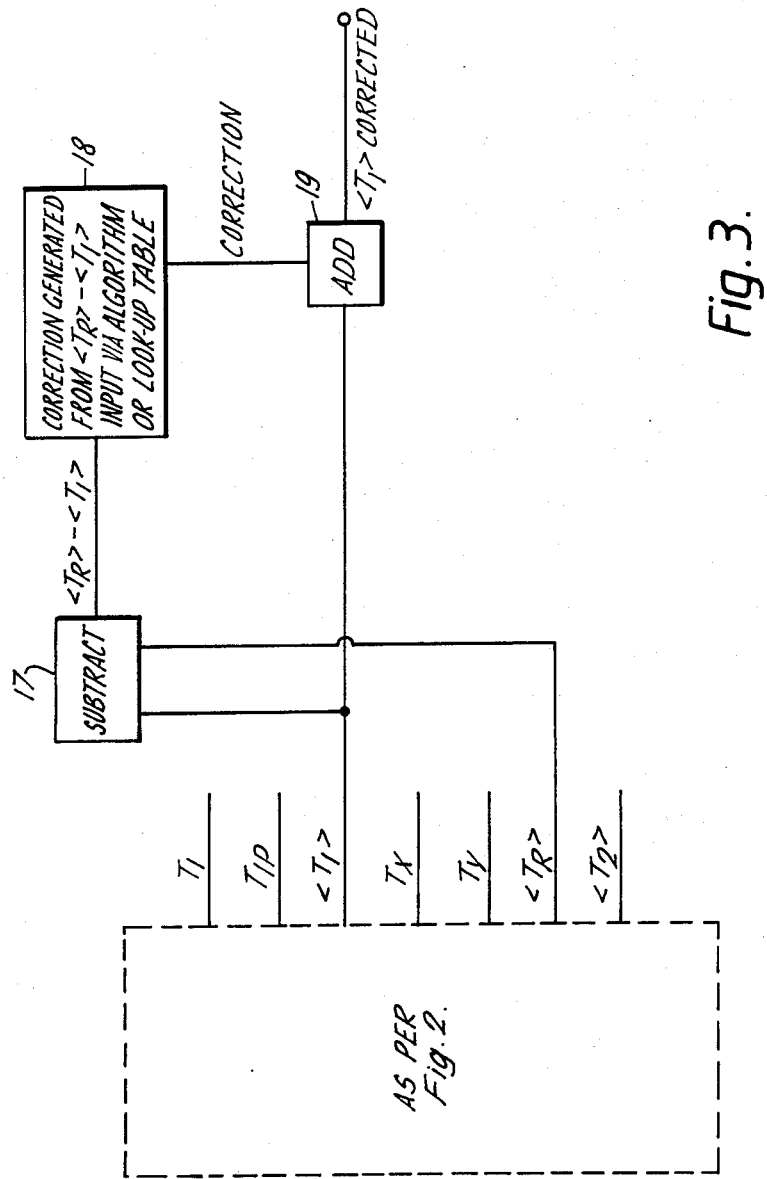
FIGS. 3 and 4 are schematic block diagrams of modifications of the examples shown in FIG. 2; and,
FIGS. 5A and 5B illustrate two radiation bands.
Figure 4:
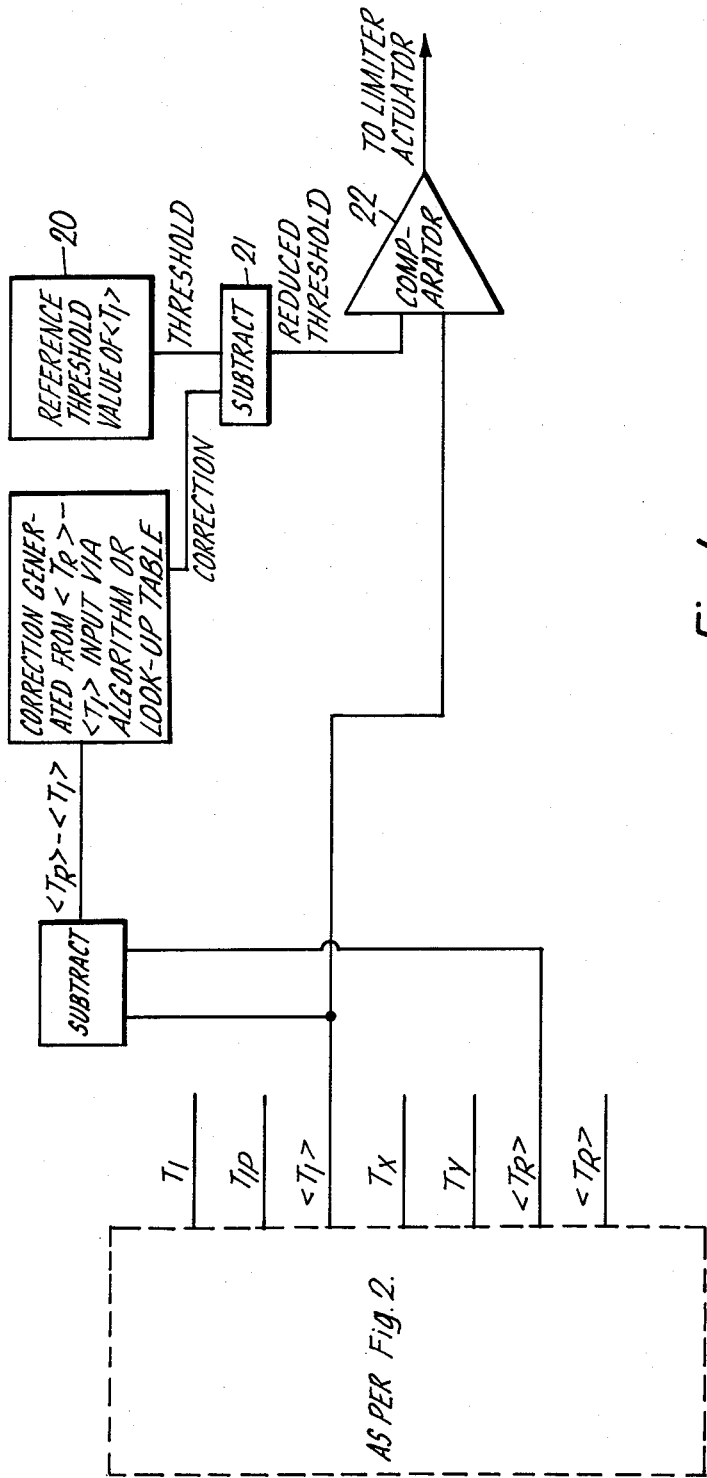

For simplicity the monitor has been omitted from FIGS. 2–4.

FIG. 2 illustrates a second example based on the example shown in FIG. 1 and so the same reference numerals have been used in FIG. 2 as in FIG. 1 to illustrate the same components. In this example, the signal $S_1$ is also fed directly to a look-up table 12 which provides a linearised output $T_1$. This is fed to an adder/subtractor circuit 13 which provides the output $T_X$ and also an output signal $T_Y$ defined as:

$$T_Y = <T_R> + T_1 - <T_1> \qquad (2)$$

The signal $<S_2>$ is fed to an additional look-up table 14 where it is linearised into an equivalent temperature $<T_2>$.

It has been previously been mentioned that the relationship $<T_R> - <T_1>$ provides an indication of optics fouling. The FIG. 2 example illustrates a way in which this can be monitored in which the two signals are fed to a subtractor 15 whose output $<T_R> - <T_1>$ is fed to a comparator 16. The other input of the comparator 16 is a predetermined threshold while the output from the comparator is fed to an alarm circuit (not shown). Thus, once the output from the subtractor 15 exceeds the threshold indicating an undesirable degree of fouling this will initiate the alarm circuit.

The calibration of the apparatus will usually be fixed (by adusting amplifier gains) at a single target temperature, for example 900° C. Various drift correcting devices in the instrument will also be optimised for this temperature. Possibly, this temperature will be at, or near, the maximum temperature envisaged, in which case signal to noise ratios will be optimum. In this case, the presence of fouling might be tested each time the mean rotor temperature $<T_1>$ reaches the vicinity of 900° C.

In certain applications of the invention the spectral characteristic of the optical obscuration may be predictable either from general experience or from specific prior experimentation. In these cases, the magnitude of the obscuration may be estimated from the observed values of $<T_1>$, and $<T_R>$. It is then possible to apply a correction for the obscuration. FIG. 3 illustrates one example in which the signals $<T_1>$ and $<T_2>$ are fed to a subtractor 17 whose output is fed to a look-up table 18. The look-up table 18 contains correction values for modifying the determined values of $<T_1>$. These correction values are fed to an adder 19 along with the determined values $<T_1>$ so that the output from the adder 19 is a corrected value for $<T_1>$. In principle, an appropriate correction could be applied in the same way to all the outputs from the apparatus shown in FIG. 2.

An alternative arrangement is illustrated in FIG. 4 in which instead of applying the correction to the determined values, the correction is subtracted from a reference threshold for the corresponding determined value held in a store 20. The reference threshold and correction value are fed to a subtractor 21 whose output constituting a reduced threshold is fed to a comparator 22. The other input of the comparator 22 constitutes the determined value $<T_1>$. This is particularly useful in the case of aeroplane engines where the output of the comparator 22 is used to operate a top temperature limiter.

The value of $<T_R> - <T_1>$ might be recorded (updated) each time the engine passed the vicinity of optimum measurement precision (for example 900° C.). The "current" value of the relationship would then be used to generate a correction for obscuration based on correlations from prior experimentation.

For example, suppose prior experimentation shows that $<T_1>$ typically falls by 1.2° C. for each 1% obscuration while $<T_R>$ rises by 0.3° C. In this case appropriate corrections are as follows:

$$T_{1P} > T_{1P} + \frac{1.2}{1.5}(<T_R> - <T_1>) = T_X -$$

$$\frac{1}{5}(<T_R> - <T_1>)$$

$$T_1 > T_1 + \frac{1.2}{1.5}(<T_R> - <T_1>) = T_Y -$$

$$\frac{1}{5}(<T_R> - <T_1>)$$

$$<T_1> > <T_1> + \frac{1.2}{1.5}(<T_R> - <T_1>) =$$

$$<T_Y> - \frac{1}{5}(<T_R> - <T_1>)$$

$$<T_R> > <T_R> - \frac{1}{5}(<T_R> - <T_1>)$$

The concept of applying corrections (either to observed temperature or over temperature threshold) could have a dramatic affect on cleaning intervals. For example, recent results with a simple monochromatic system indicate a 7° F. loss in 200 hours. If corrections could be applied for temperature drops of up to 35° F. (ie. 20% loss of signal) the cleaning interval could be extended to 1000 hours.

In these examples, it is preferable if all fast processing is carried out by analogue circuits while digital processing is used for the high precision division and linearisation processes, for example the digital processing can be carried out in a microprocessor.

We claim:

1. A method of monitoring at least one temperature characteristic of a rotating body, comprising sensing radiation emitted by the body in wavelength bands centered on two different wavelengths $\lambda_1$, $\lambda_2$ (where $\lambda_1 > \lambda_2$) to determine first and second quantities $S_1$, $<S_2>$ respectively related to the radiance profile around the body and the average radiance around the body; determining a third quantity constituting an average $<S_1>$ of said first quantity $S_1$; determining a fourth quantity related to the ratio of $<S_1>$ to $<S_2>$; and monitoring a predetermined function of said first and fourth quantities and at least one of said second and third quantities, said predetermined function being related to said at least one temperature characteristic.

2. The method of claim 1, including determining a peak value $S_{1p}$ of said first quantity, said peak value being utilized in said predetermined function.

3. The method of claim 1, including determining temperatures $T_1$, $<T_1>$, $<T_R>$ corresponding to $S_1$, $<S>$, and the ratio of $<S_1>$ to $<S_2>$ respectively prior to carrying out the monitoring step, said monitoring step comprising determining a temperature $T_Y$, where $$T_Y = <T_R> + T_1 - <T_1>.$$

4. The method of claim 3, including determining a peak value $S_{1p}$ of said first quantity, determining a peak temperature $T_{1p}$ corresponding to said peak value $S_{1p}$ prior; to carrying out the monitoring step, the monitoring step further comprising determining a temperature $T_X$, where:

$$T_X = <T_R> + T_{1p} - <T_1>.$$

5. The method of claim 1, wherein said wavelength bands each have a width on the order of 1 micron.

6. The method of claim 1, wherein said wavelength bands overlap.

7. The method of claim 1, wherein each wavelength band is centered on an infra-red wavelength.

8. A radiation thermometer for determining the temperature of a rotating body comprising radiation detection means for detecting radiation in wavelength bands centered on two different wavelenghs $\lambda_1$, $\lambda_2$ (wherein $\lambda_1 > \lambda_2$) from the rotating body and for generating first and second signals $S_1$, $<S_2>$ respectively related to the radiance profile around said body and the average radiance around said body; means for generating a third signal $<S_1>$ representing an average value of the said first signal $S_1$; means for generating a fourth signal related to the ratio of $<S_1>$ to $<S_2>$; and monitoring means for monitoring a predetermined function of said first and fourth signals and at least one of said second and third signals, said predetermined function being related to a temperature characteristic of said rotating body and for providing output signals related to said predetermined function.

9. The radiation thermometer of claim 8, wherein said detection means comprises first and second signal detection means for generating said first and second signals, said first signal detection means operating at a fast rate compared with said second signal detection means.

10. The radiation thermometer of claim 8, including means for determining temperaturtes $T_1$, $<T_1>$, $<T_R>$ corresponding to $S_1$, $<S_1>$, and said ratio of $<S_1>$ to $<S_2>$ respectively prior to carrying out said monitoring, said monitoring means determining a temperature $T_Y$, where:

$$T_Y - <T_R> + T_1 - <T_1>.$$

11. The radiation thermometer of claim 10, wherein said detection means also generates a peak value $S_{1p}$ of said first signal $S_1$, the thermometer including means for determining a peak temperature $T_{1p}$ corresponding to said peak value $S_{1p}$, said monitioring means also determining a temperature $T_X$, where:

$$T_X < T_R > + T_{1p} - <T_1>.$$

12. The radiation thermometer of claim 11, wherein said monitoring means is adapted additionally to monitor the value of $<T_R> - <T_1>$ to monitor the degree of fouling of the detection means.

* * * * *